US007645959B2

(12) United States Patent
Krink et al.

(10) Patent No.: US 7,645,959 B2

(45) Date of Patent: Jan. 12, 2010

(54) NOZZLE FOR PLASMA TORCHES

(75) Inventors: Volker Krink, Finsterwalde (DE); Frank Laurisch, Finsterwalde (DE); Gerd Lotze, Dresden (DE); Thomas Weissgaerber, Dresden (DE); Kerstin Kuemmel, Dresden (DE); Wolfram Moehler, Freiberg (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 0 days.

(21) Appl. No.: 10/554,051

(22) PCT Filed: Apr. 21, 2004

(86) PCT No.: PCT/DE2004/000889

§ 371 (c)(1), (2), (4) Date: Nov. 6, 2006

(87) PCT Pub. No.: WO2004/095896

PCT Pub. Date: Nov. 4, 2004

(65) Prior Publication Data

US 2007/0056936 A1 Mar. 15, 2007

(30) Foreign Application Priority Data

Apr. 23, 2003 (DE) ................................ 103 23 014

(51) Int. Cl.
*B23K 10/00* (2006.01)

(52) U.S. Cl. ............................ 219/121.51; 219/121.59; 219/121.48; 315/111.21

(58) Field of Classification Search ............ 219/121.52, 219/119, 121.5, 121.59, 75, 121.48, 121.36; 313/231.21, 231.41; 315/111.21, 111.51

See application file for complete search history.

(56) References Cited

U.S. PATENT DOCUMENTS

| | | | | | |
|---|---|---|---|---|---|
| 3,504,219 | A | | 3/1970 | Gejo et al. | |
| 3,597,576 | A | * | 8/1971 | Bernard et al. | 219/137.43 |
| 3,790,742 | A | | 2/1974 | Auer | |
| 4,982,067 | A | * | 1/1991 | Marantz et al. | 219/121.47 |
| 4,992,642 | A | * | 2/1991 | Kamp et al. | 219/121.52 |
| 5,628,924 | A | * | 5/1997 | Yoshimitsu et al. | 219/121.5 |
| 2002/0125220 | A1 | * | 9/2002 | Augeraud et al. | 219/121.5 |

FOREIGN PATENT DOCUMENTS

| | | |
|---|---|---|
| DE | 691 10 541 | 11/1991 |
| DE | 100 44 764 | 4/2002 |
| DE | 699 01 731 | 12/2002 |
| EP | 0 194 634 | 9/1986 |
| FR | 2813158 | 2/2002 |

* cited by examiner

*Primary Examiner*—Mark H Paschall
(74) *Attorney, Agent, or Firm*—Jacobson Holman PLLC

(57) ABSTRACT

Nozzles for plasma torches are essentially formed from a metal or a metal alloy. To increase the life of such nozzles wear-resistant microparticles of a hard material, preferably a hard ceramic material, are embedded in the metal or the metal alloy, at least in certain regions. The nozzles can be advantageously manufactured by extrusion.

14 Claims, No Drawings

NOZZLE FOR PLASMA TORCHES

This is a nationalization of PCT/DE04/000889 filed Apr. 21, 2004 and published in German.

FIELD OF THE INVENTION.

The invention relates to a nozzle for plasma torches and to a method for manufacturing such nozzles. Such a nozzle consists essentially of a metal or a metal alloy with an increased thermal conductivity. In addition, such a plasma torch nozzle is usually cooled. It can be employed for plasma welding and, preferably, for plasma cutting.

BACKGROUND OF THE INVENTION.

As is known, plasma torches have two extremely highly loaded elements. These are firstly, the electrode connected as the cathode, which is arranged within the plasma torch, and secondly, the corresponding nozzle, by means of which the plasma jet is directed onto the respective workpiece surface.

In this arrangement, the nozzle of such plasma torches is also subject to substantial loading due to the very high temperatures and, in addition, due to the flow kinetics of the hot plasma jet, which emerges through the nozzle opening and has a high flow velocity. Because of these effects, which in some cases are further increased by plasma pressure fluctuations, a removal of metallic nozzle material occurs, it being also frequently impossible to avoid delamination, cratering or flaking.

Correspondingly, the nozzles conventionally employed on plasma torches also have a relatively short life and must, in consequence, be regularly exchanged, so that the exchange of nozzles due to wear represents a cost factor for such installations.

SUMMARY OF THE INVENTION.

The object of the invention is therefore to propose possibilities for increasing the life of nozzles for plasma torches.

According to the invention, this object is achieved by means of a nozzle for plasma torches, and by means of a manufacturing method for such nozzles.

The plasma torch nozzles according to the invention consist essentially of metal or a metal alloy, preferably copper or a copper alloy. In addition, however, wear-resistant microparticles of a hard material are embedded, at least in some regions, in the metal or the metal alloy.

Because of the embedded microparticles, the strength can be increased but, at the same time, the thermal conductivity, the precondition for an effective cooling of nozzles according to the invention, is only reduced to a negligible extent.

The microparticles embedded in the metal matrix should not exceed a maximum grain size of 30 μm, preferably of 15 μm. Microparticles can also be embedded whose grain size is in the nanometer range, so that the microparticle concept selected for the invention shall also include a grain size range between 0.01 and 30 μm.

Microparticles with almost constant grain size can be embedded in the metal or the metal alloy of which the actual nozzle for plasma torches essentially consists.

It is, however, also possible for microparticles within a specified grain size spectrum to be embedded, in which case the average grain size $d_{50}$ of such a grain size spectrum should then be located around a grain size in the range between 1 and 5 μm. In consequence, particles, which are also smaller than 1 μm (as low as 0.01 μm), can be embedded.

The microparticles to be embedded, according to the invention, should consist of a hard ceramic material.

Different oxides, carbides, nitrides or also borides are suitable for this purpose.

Carbides, and here again silicon carbide or also boron carbide, have been found to be particularly suitable. The designated carbides, in particular, reduce the thermal conductivity of the nozzle material to only a slight extent and can, in addition, be employed in a manner favorable with respect to cost.

It is also, however, possible to embed microparticles of at least two of the previously designated chemical compounds into the metal or metal alloy forming the nozzle so that, if appropriate, an optimization with respect to the achievable strength, wear resistance and desired thermal conductivity capability can be achieved.

The microparticles to be embedded, according to the invention, can be arranged so that they are distributed within the total volume of a nozzle.

Taking account of the wear influences mentioned, however, this is not absolutely necessary, so that the embedding of microparticles can also take place with local differentiation and, by this means, it is possible to take account of the corresponding process conditions present in or on the nozzle during the plasma processing.

Microparticles can thus be embedded in the region pointing toward the inside of the nozzle so that the thermal and flow kinetic influences there can be dealt with more effectively.

It is, however, also possible to embed microparticles exclusively in the region of the nozzle opening.

In addition, however, microparticles can be embedded in a locally differentiated manner, with certain volume regions being free of microparticles. This can, for example, be realized by means of a strip-shaped, spiral-shaped or circular ring-shaped embedding of microparticles, it being also possible to form a plurality of such mutually separated strips, spirals or rings.

The embedded microparticles should fill a volume proportion of between 0.5 and a maximum of 15% of the total volume of a nozzle according to the invention. A volume proportion of a maximum of 10% can, however, be sufficient to achieve the desired effects.

The nozzles, according to the invention, for plasma torches can be advantageously manufactured in such a way that a powder mixture of the metal or metal alloy employed, preferably copper or copper alloy, with the respective microparticles, is subjected to a preferably hydrostatic extrusion process.

By this means, at least one solid cylindrical or hollow cylindrical shape can be formed and an adequate thickness of the nozzle material achieved.

The possibility subsequently exists of forming the final nozzle contour by chip-removal machining alone or in combination with a metal-forming process. The final contour can, however, also be formed exclusively by means of a metal-forming process while avoiding chip-removal machining.

The invention is explained in more detail below using an example.

In order to manufacture an example of a nozzle according to the invention, electrolytic copper in powder form was intensively mixed with 4% by mass of silicon carbide powder. The silicon carbide powder had an average grain size $d_{50}$ of 2 μm. A cylinder with an external diameter of approximately 20 mm and a length of 250 mm was manufactured from the powder mixture by cold isostatic pressing.

A smooth surface with an external diameter of 15 mm was obtained by chip-removal machining.

This cylindrical insert was inserted in a copper cylinder with a corresponding internal bore, which copper cylinder had an external diameter of 80 mm.

The external diameter was subsequently reduced to 23 mm by extrusion. The cylindrical body obtained in this way had a core region with a diameter of 3.8 mm, in which the silicon particles were embedded.

Using a plasma torch nozzle which was manufactured from this, a 30% increase in life was achieved, as compared with a conventional nozzle, this improvement being achieved in the case of the plasma cutting of structural steel, with oxygen as the plasma gas and with an electrical current strength of 150 A.

The invention claimed is:

1. A nozzle for plasma torches, said nozzle comprising a body integrally formed of (a) a metal or a metal alloy and said metal or said metal alloy being mixed with (b) wear-resistant microparticles of a hard material different from the metal or the metal alloy, said microparticles being uniformly distributed within a total volume of the metal or the metal alloy, said body including an arc forming region, said microparticles filling a volume proportion in the range between 0.5 and 15% in the body.

2. The nozzle as claimed in claim 1, wherein a maximum grain size of said embedded microparticles is less than or equal to 30 μm.

3. The nozzle as claimed in claim 1, wherein a maximum grain size of said embedded microparticles is less than or equal to 15 μm.

4. The nozzle as claimed in claim 1, wherein said hard material is a carbide.

5. The nozzle as claimed in claim 1, wherein said hard material is silicon carbide.

6. The nozzle as claimed in claim 1, wherein said hard material for the microparticles is at least one of an oxide, a carbide, a nitride and a boride.

7. The nozzle as claimed in claim 1, wherein said microparticles are in a grain size spectrum around an average grain size $d_{50}$, which is located in the range between 1 and 5 μm.

8. The nozzle as claimed in claim 1, wherein said microparticles are embedded in a region pointing toward an inside of the body.

9. The nozzle as claimed in claim 1, wherein said microparticles are located in a region of an opening of the body.

10. The nozzle as claimed in claim 1, wherein said microparticles are located in a locally differentiated manner.

11. The nozzle as claimed in claim 1, wherein said metal or metal alloy is essentially copper or a copper alloy.

12. A method for manufacturing a nozzle for plasma cutting torches as claimed in claim 1, wherein the nozzle is manufactured by extrusion from a metal or metal alloy powder mixture containing said microparticles.

13. The method as claimed in claim 12, wherein a final contour of the nozzle is formed by at least one of a chip-removal machining process and a metal-forming process.

14. The nozzle as claimed in claim 1, wherein said hard material is a ceramic material.

* * * * *